United States Patent [19]

Torbert

[11] Patent Number: 5,027,001
[45] Date of Patent: Jun. 25, 1991

[54] MOISTURE SENSITIVE AUTOMATIC WINDSHIELD WIPER AND HEADLIGHT CONTROL DEVICE

[76] Inventor: William F. Torbert, Rte. 5, Box 894, Valdosta, Ga. 31602

[21] Appl. No.: 399,979

[22] Filed: Aug. 29, 1989

[51] Int. Cl.[5] ............................................. B60S 1/08
[52] U.S. Cl. ............................... 307/10.1; 307/10.8; 315/82; 318/DIG. 2
[58] Field of Search ........... 15/250.12, 250.13, 250.14, 15/250.17; 318/444, DIG. 2; 315/77, 82, 83; 307/9.1, 10.1, 10.8

[56] References Cited

U.S. PATENT DOCUMENTS

| | | | |
|---|---|---|---|
| 3,500,119 | 3/1970 | Price | 315/82 |
| 3,519,837 | 7/1970 | Nolin et al. | 315/82 |
| 3,600,596 | 8/1987 | Aloisantoni | 315/82 |
| 3,824,405 | 7/1974 | Glaze | 307/10.8 |
| 4,057,742 | 11/1977 | Binegar | 315/82 |
| 4,527,103 | 7/1985 | Shiraishi | 318/444 |
| 4,705,999 | 11/1987 | Millerd et al. | 318/444 |
| 4,859,867 | 8/1989 | Larson et al. | 318/DIG. 2 |
| 4,897,585 | 1/1990 | Millerd et al. | 318/444 |

Primary Examiner—Todd E. DeBoer
Assistant Examiner—Jeffery A. Gaffin

[57] ABSTRACT

The invention is directed to an automatic system for activating vehicle headlights upon the actuation of a windshield wiper. The windshield wipers automatically begin a wiping cycle when moisture is sensed on a windshield. In the preferred embodiment, a moisture sensing device is strategically placed in the left-hand side of the windshield, at the end of a wiper blade track. When the windshield is no longer wet, the wiping cycle will stop and the headlights will remain on for a short period of time thereafter before turning off.

6 Claims, 2 Drawing Sheets 5,027,001

MOISTURE SENSITIVE AUTOMATIC WINDSHIELD WIPER AND HEADLIGHT CONTROL DEVICE

FIELD OF THE INVENTION

This invention relates to an automatic windshield wiper control system and more particularly, to an automatic windshield wiper control system which activates the vehicle headlights upon the sensing of moisture, by a moisture sensing device located on the windshield.

BACKGROUND OF THE INVENTION

In recent years, in order to instill highway safety, many states have passed laws requiring the use of windshield wipers and headlights during light or heavy bad weather conditions such as rain, sleet or snow. Accidents occur each year due to bad weather conditions, control failure or operator carelessness, and because of this growing rate, a great emphasis has been put on improving safety features in vehicles made today.

Various complex designs and expensive configurations for automatic windshield wipers or automatic headlights are well known in the prior art. None though, have attempted, in a simple and inexpensive way, to devise an automatic control system whereby the headlights are automatically turned on after the windshield wipers are automatically activated due to moisture detected by a moisture sensing device on the windshield.

It is estimated that approximately 95% of all adjustments to the windshield wipers are performed manually during periods of light rain or intermittent bad weather conditions. The current delayed or pulsed wiper control systems used in the prior art fail to adjust to changes in the level of moisture striking the windshield, resulting in constant adjustments being required by the operator of the vehicle. Although the prior art has attempted to correct this deficiency at great expense or through very complex circuitry, none address efficiently the need and importance of ensuring that the headlights of the vehicle are turned on for the safety of the vehicles occupants.

SUMMARY OF THE INVENTION

It is the object of the present invention to provide a moisture sensing automatic windshield wiper and headlight control system.

It is the object of the present invention to provide a moisture sensing automatic windshield wiper and headlight control system wherein the headlights operate upon the actuation of the windshield wipers.

It is the object of the present invention to provide a moisture sensing automatic windshield wiper and headlight control system wherein an automatic sensing device is attached on the outside portion of the windshield.

Another object of the present invention is to provide a control system wherein the headlights are automatically turned off upon the deactivation of the windshield wipers.

It is further the object of the present invention to provide a simple set of instructions so the system can be easily installed by even a "back-yard-mechanic".

It is still another object of the present invention to provide a system which addresses both problems in a simple and very economical solution.

These and other objects and features of the present invention will be apparent from the following description and appended claims.

DETAILED DESCRIPTION OF THE PREFERRED EMBODIMENT

Figure 1:
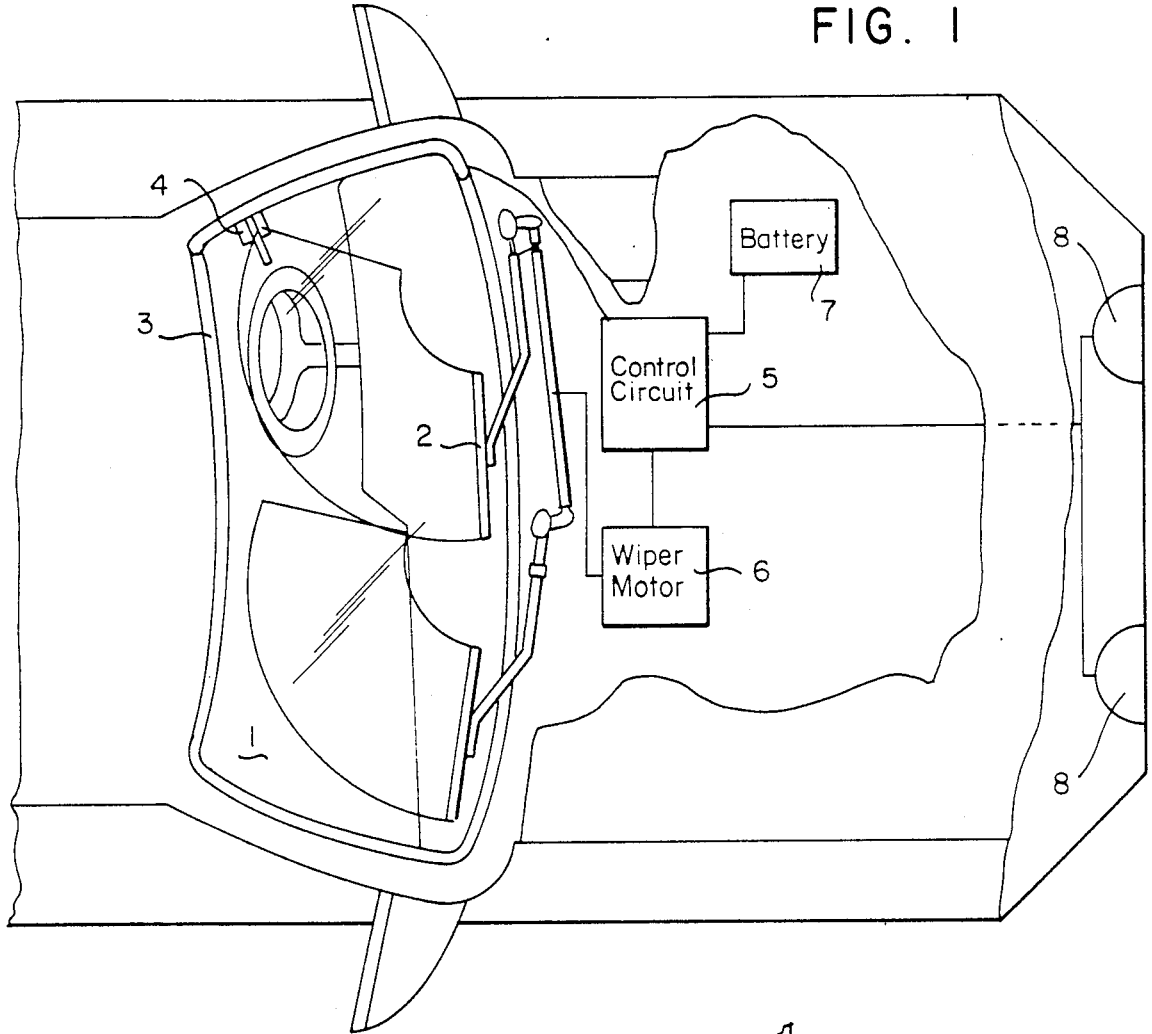
FIG. 1 is a top view showing in partial cutaway the present invention adapted to the forward portion of a automotive vehicle.

Referring to the drawings, FIG. 1 is a top plan view illustrating a vehicle windshield (1), including windshield wipers (2) and a weather stripping portion (3). Strategically mounted on the outside surface of the left-hand side of the windshield is a moisture sensing device (4). The moisture sensing device 4 connects a control circuit (5) to a wiper motor (6), to a battery (7) and headlights (8).

When control circuit (5) is activated, wiper motor (6) is connected to battery (7), via the control circuit (5), to complete the circuit for activating the windshield wiper's (2) cycle. After activation of the windshield wiper's (2) cycle the control circuit (5) is activated, the control circuit (5) is connected to the battery (7) to complete the circuit for actuating the headlights (8). When the control circuit (5) is deactivated, the wiper motor (6) is disabled returning the windshield wipers (2) to a parked position and following, the circuit of the headlights (8) is disabled after a 300 second time delay.

Figure 2:
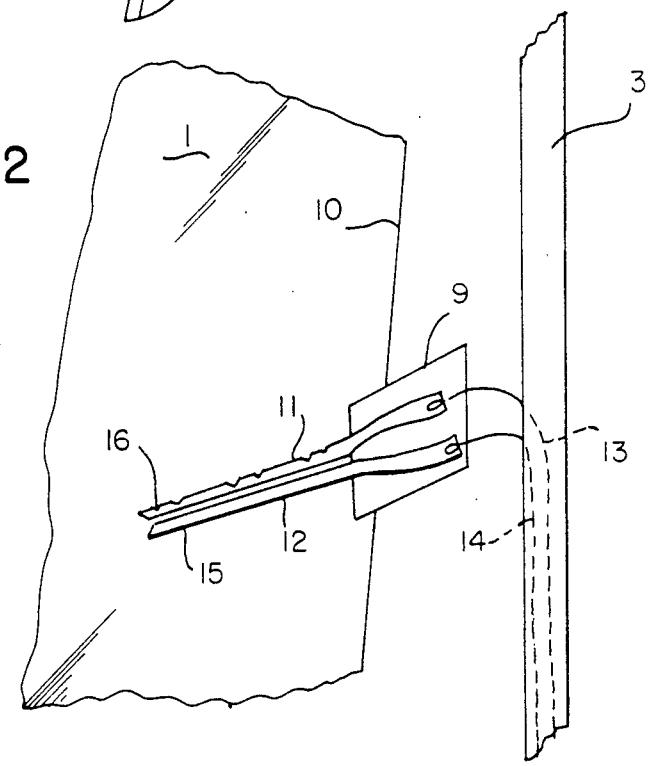
FIG. 2 shows a blow up view of the present invention.

Referring now specifically to FIG. 2, a blow up view of the present invention and detailed embodiment of the moisture sensing device (4), shown in FIG. 1.

The control circuit (5) is connected to the moisture sensing device (4), via a upper lead (13) and a lower lead (14), generally composed of twenty-four gauge wire, which are concealed by the weather stripping (3). The moisture sensing device (4) is comprised of two narrow, upper and lower, parallel positioned bands of aluminum-tin alloy film (11 and 12). The two bands (11 and 12) have a thickness for example of several microns. Typically, the two bands and (11 and 12) will be of some length, width and spacing in order to activate the control circuit (5), shown in FIG. 1, sufficiently. The two bands (11 and 12) are generally partially disposed within a urethane seal (9) or of some flexible plastic material of the like. The two bands (11 and 12) are adhered to the outer surface of the windshield with an adhesive (15) on the underside of the bands (11 and 12), which is not shown in FIG. 2. The two bands (11 and 12) are positioned for encountering a wiper blade (2) in a normal track (10). It is anticipated that only one wiper blade (2) of a two wiper blade conventional vehicle windshield wiping system will encounter the two narrow bands (11 and 12) in its pass. A notch (16) located in the narrow upper band (11) typically channels water down the windshield (1), for the purpose of successfully activating the control circuit (5) when the vehicle is not in motion.

Figure 3:
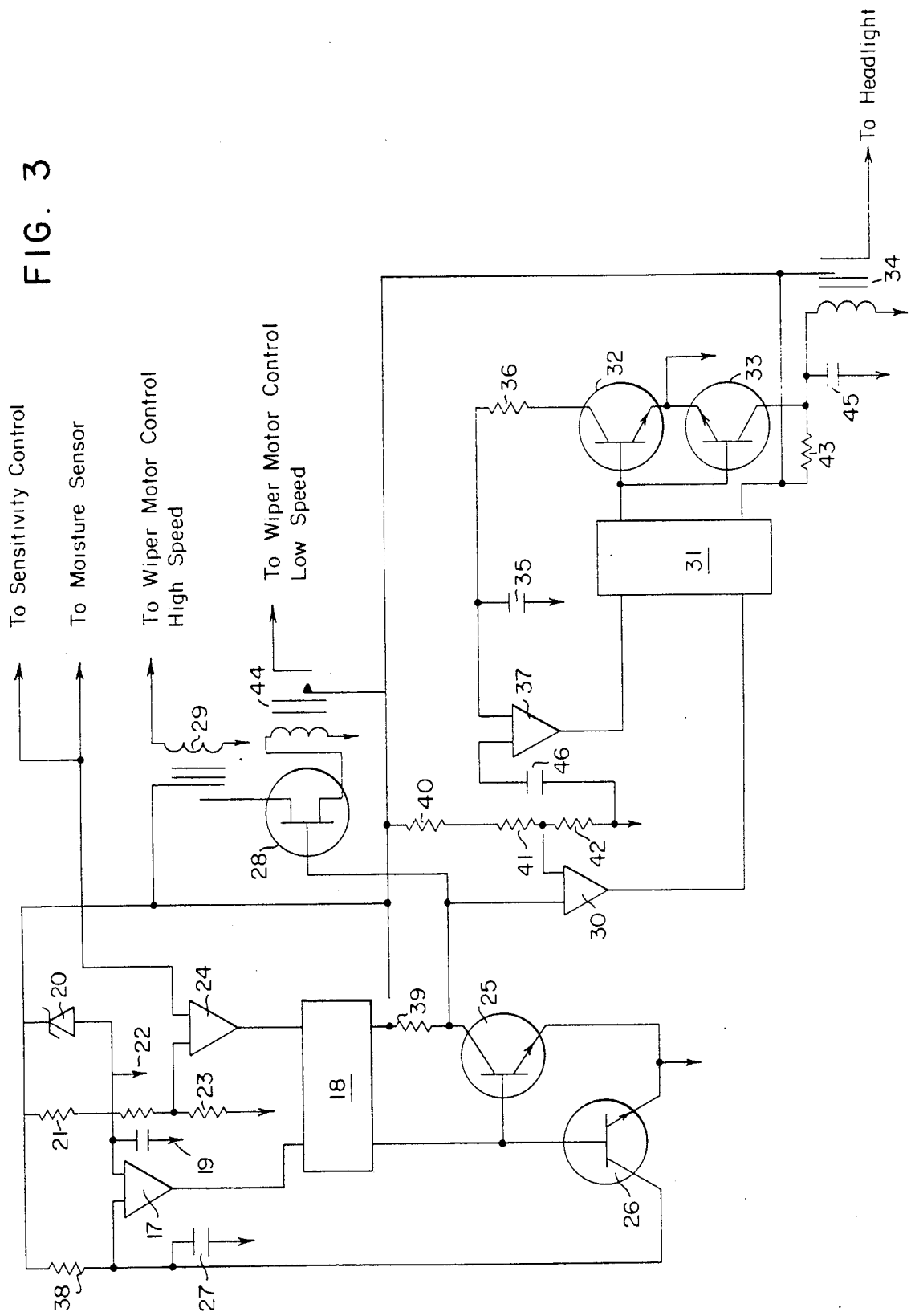
FIG. 3 is a detailed schematic showing the circuitry of FIG. 1.

Referring to FIG. 3, the control circuitry is shown. In the control circuitry of stage one, during the quiescent state, the output level of an operational amplifier (17) has been set to provide a low level signal to the input of a bi-stable multi-vibrator (18). A capacitor (19) and a zener diode (20) eliminate false triggering of the circuit. Resistors (21, 22, and 23) provide a reference voltage inputted to one side of a operational amplifier (12). The other side of the operational amplifier (24) is connected to the sensing device via twenty-four gauge wire, which has been concealed under the weather stripping (3) which runs along the edge of the windshield (1). This is also connected to the sensitivity control, not shown in drawings, which will allow the operator to increase or decrease the circuits sensitivity to a desired speed. When the correct level of moisture has been achieved, the input from the sensor will override the reference voltage on the operational amplifier (24), causing the output to rise to a positive state level, which in turn will cause the bi-stable multi-vibrator (18) to change states. The output of the bi-stable multi-vibrator (18) will place a low state signal on the inputs of transistors (25 and 26), thus causing the transistors (25 and 26) to cut off. When transistor (26) cuts off, its collector will begin to rise to a position level which is due to the charging action of capacitor (27). The time required for capacitor (27) to reach a positive enough level to trigger the operational amplifier (17) is determined by the RC time constant of capacitor (27) and resistor (38). The RC time constant has been set to be approximately one to two seconds which has been determined to be sufficient for the wipers to escape the parked position. While capacitor (27) is charging, the collector of transistor (25) is also rising to a high state level. This change in the output level is felt on the input of both a field effect transistor (FET) (28) and a operational amplifier (30). The drain of FET (28) is connected across the normally closed contacts of a relay (29). If the operator of the vehicle decides to run the wipers in the high speed mode, the relay (29) will energize, disabling the control circuit from applying power to the wiper motors low speed mode.

The following option is included which makes it possible to apply power to both sets of windings in the wiper motor without resulting in over-heating and eventual burnout of the motor. This feature is not present in the prior art. The rise in the collector voltage of the transistor (25), will cause the output of the operational amplifier (30) to change to a high state level, which in turn will cause the bi-stable multi-vibrator (31) to change states, placing a high to the base of the transistors (32 and 33). The conduction of transistor (33) will cause a relay (34) to energize, thereby placing voltage to the headlights (8). A capacitor (35) and a resistor (36) make up an RC time constant of 300 seconds. If no other state triggered signals are sent to the triggered bi-stable multi-vibrator (31) via operational amplifier (30), then the charge of capacitor (35) will cause a operational amplifier (37) to reset the state of a bi-stable multi-vibrator (31), thereby de-energizing the relay (34). Concluding that, if there is no further activity by the wiper sensors, the lights will turn off after a 300 second or 5 minute time delay.

While the invention has been described using specific embodiments, it is to be appreciated that these embodiments are provided for illustrative purpose only and is not for the purpose of limiting the invention. Various changes or modifications may be made by those persons skilled in the art to the specific embodiment without departing from the scope of the present invention as described in the following claims.

I claim:

1. An automatic moisture sensitive control system for a vehicle having a windshield wiper control system and a headlight control system, said moisture sensitive control system comprising;
    a moisture sensing unit, said moisture sensing unit having a first narrow moisture sensing band and a second narrow moisture sensing band;
    said first narrow moisture sensing band of said moisture sensing unit having notches along an upper edge to channel water running down the windshield when said vehicle is not in motion;
    an automatic control circuit for controlling said moisture sensing unit and activating said windshield wiper control system and the said headlight control system to begin operation, said control circuit including a first stage circuitry, wherein said first stage circuitry sends control signals to the windshield wiper control system to automatically activate the said vehicle headlight control system.

2. The invention of claim 1 wherein said moisture sensitive control system is located in an upper left-hand corner of the windshield.

3. The invention of claim 1 wherein said moisture sensitive control system comprises a protective urethane seal.

4. The invention of claim 1 wherein said automatic control circuit comprises two bi-stable multi-vibrators.

5. The invention of claim 1 wherein said first and second narrow moisture sensing bands are made of super thin, highly abrasion resistant, self-adhesive aluminum-tin alloy film.

6. A method for controlling an automatic moisture sensitive control system, including a windshield wiper control system and a headlight control system, comprising the steps of:
    sensing moisture on a vehicle windshield by a moisture sensing unit;
    automatically activating a windshield wiper control system controlled by a signal generated from an automatic control circuit upon sensing moisture on the vehicle windshield;
    automatically activating a headlight control system upon detecting activated windshield wiper control system;
    automatically disabling said windshield wiper control system and said headlight control system when moisture is no longer sensed on said windshield by said moisture sensitive unit;
    automatically disabling said automatic control circuit when an operator of said vehicle chooses to manually place windshield wipers in a high speed mode, thereby preventing over-heating of a windshield wiper motor.

* * * * *